No. 731,065.  
Patented June 16, 1903.

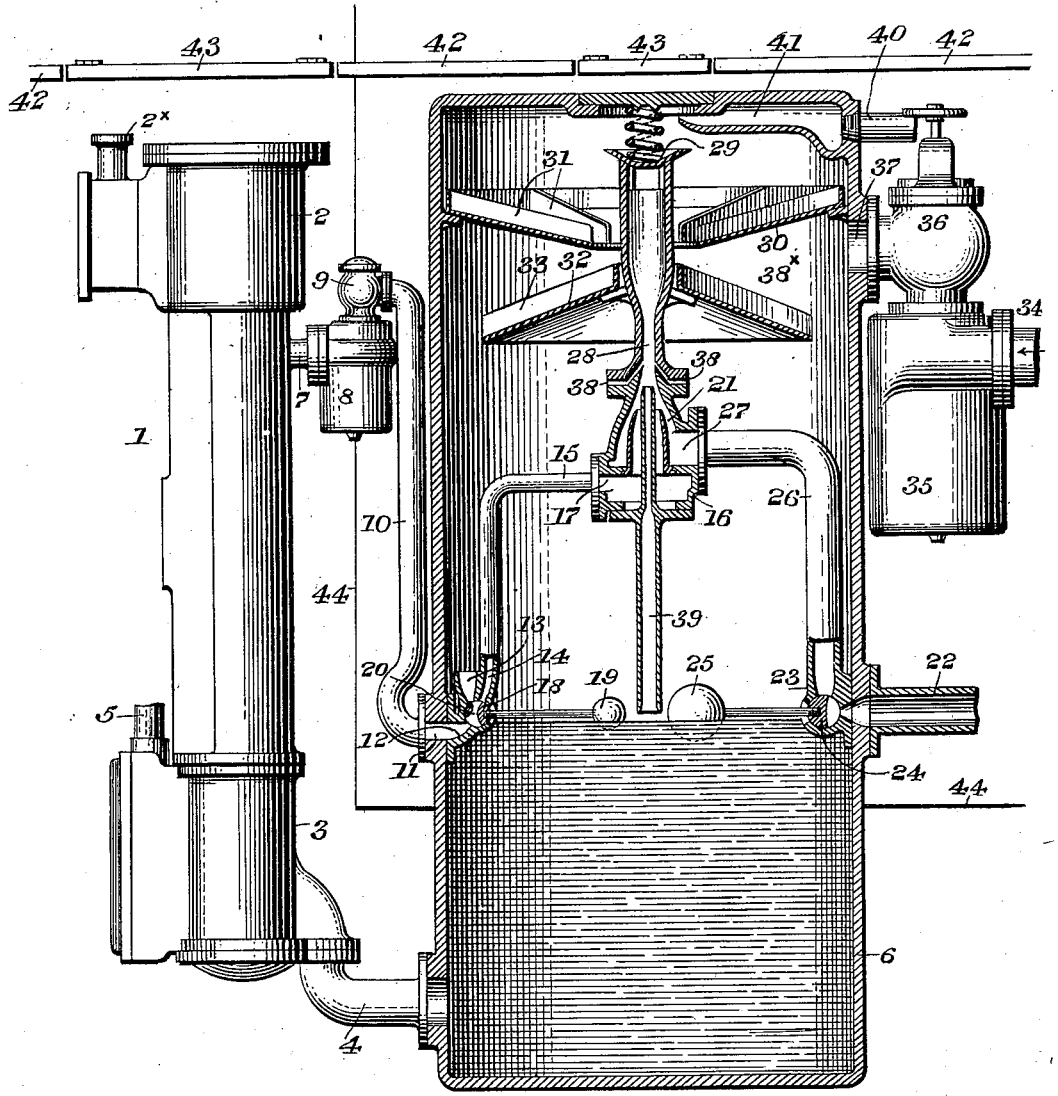

UNITED STATES PATENT OFFICE.

THOMAS C. McBRIDE, OF PHILADELPHIA, PENNSYLVANIA.

FEED-WATER HEATER.

SPECIFICATION forming part of Letters Patent No. 731,065, dated June 16, 1903.

Application filed November 8, 1902. Serial No. 130,526. (No model.)

*To all whom it may concern:*

Be it known that I, THOMAS C. MCBRIDE, a citizen of the United States, residing in the city and county of Philadelphia, State of Pennsylvania, have invented a new and useful Improvement in Feed-Water-Heating Systems for Locomotive and other Boilers, of which the following is a specification.

The present state of the art of heating water by exhaust-steam in "open" feed-water heaters for boiler-feeding purposes, where the cold-water supply has sufficient pressure to drive it into the heater, involves the use of a float in the heater, which either controls a water-admission valve in the cold-water-supply pipe to the heater or the throttle of the boiler feed-pump. If the water-admission valve is controlled by the float, the feed-pump throttle is regulated by hand as the needs of the boiler may require. An increase of the speed of the feed-pump tending to lower the level of the water in the heater will cause the float to sink, and thereby open further the water-admission valve and permit the entrance of a greater amount of water to the heater to replace the increased amount being taken out by the feed-pump. If the feed-pump throttle is regulated by this float, the valve admitting cold water to the heater is manipulated by hand to provide an increased or decreased amount of water for the boiler. This manipulation will cause a corresponding tendency to change the level of the water in the heater and the position of the float and the pump-throttle connected to it, eventually changing the speed of the feed-pump corresponding to the change first made in the opening of the cold-water-admission valve. Where the cold water to be heated must be forced by special means into the heater, two entirely separate pumps are employed, one pump to force cold water into the heater, the other to force the heated water into the boiler. The throttle-valve of one of these pumps is then controlled by the position of a float in the heater and that of the other regulated by hand or automatic means as the feed-water requirements of the boiler may vary. If the float in the heater controls the throttle, and therefore the speed of the boiler feed-pump, and more water is needed in the boiler, the water-supply-pump throttle is opened further by hand. This tends to increase the amount of water in the heater, raises the float, thereby increasing the opening of the feed-pump throttle, and causing the feed-pump to force the desired increased amount of water into the boiler. So, also, if the float in the heater controls the throttle and speed of the heater cold-water-supply pump a change in the amount of feed-water required by the boiler, met by a corresponding hand readjustment of the feed-pump throttle and speed of the feed-pump, will result in a corresponding tendency to take more or less heated water out of the heater, a like change in the position of the heater-float, and through it of the cold-water-supply pump throttle and speed of its pump.

In my present invention I have done away with the necessity for two entirely separate pumps and much simplified the feed-water-heating system by arranging that the feed-pump in addition to feeding the boiler shall also operate some device for forcing water into the heater. This device is so connected to or controlled by the feed-pump that it will always deliver to the heater approximately that amount of water which after condensing enough steam in the heater to heat it will furnish to the feed-pump its full quota of water. Since, therefore, the heater is always supplied with approximately the exact amount of water required to replace that taken out by the feed-pump, little further adjustment of the system is required. This further adjustment and other provisions to make the system more automatic and reliable are fully described in the specification. It is evident that a second pumping-cylinder so attached to the usual steam-driven direct-acting boiler feed-pump or a power-driven feed-pump as to take its motion from it will furnish a means of forcing cold water into the heater in amounts proportional to that being taken out by the feed-pump and that the relative sizes of the feed-pumping cylinder and of the heater cold-water-supply cylinder can be so prearranged that practically no further adjustment of the system is required. It is also evident that an injector operated by the exhaust-steam from the feed-pump can be arranged to supply the heater in amounts proportional to the speed of and approximately corresponding to that taken out by the feed-pump, and it is this latter system which I elect to illustrate and describe in detail. This new system will also commend itself as being especially applicable to locomotive or other boilers on account of its great compactness.

My invention further consists of other novel features of construction, all as will be hereinafter fully set forth, and pointed out in the claims.

The figure represents a vertical sectional view, partly in elevation, of a feed-water-heating system and its adjuncts embodying my invention.

Referring to the drawing, 1 designates a feed-pump consisting of the steam-cylinder 2, a steam-pipe $2^x$, having in it the usual hand-controlled valve to regulate its speed, the water-pumping cylinder 3, having the suction-pipe 4 and the discharge-pipe 5, leading eventually to the boiler, said suction-pipe communicating with the lower portion of the heater-chamber 6, which is made sufficiently large to contain the usual filtering devices. (Not shown.)

7 designates the feed-pump exhaust-steam pipe, leading from the steam-cylinder 2 to the separator 8 through check-valve 9 and pipe 10, which discharges this exhaust-steam through the passage 11 in the valve-casing 12, which has the two outlets 13 and 14. Said outlet 13 discharges directly into the heater, while said outlet 14 discharges through the pipe 15 into the injector-casing 16 at the point 17.

18 designates a valve operated by the float 19, said valve having a port 20 therethrough.

The injector-casing 16 is provided in its interior with the nozzle 21.

22 designates the water-supply pipe, through which the feed-water to be heated is drawn into the heater. This discharges into the valve-casing 23, containing the valve 24, controlled by the float 25, said casing discharging through the pipe 26 into the chamber 27 of the injector-casing 16.

28 designates the combining-tube, wherein the exhaust-steam injected through the pipe 15 and the water entering through the pipe 26 meet and combine, passing upwardly to and through the spraying device 29, from which point the water falls upon the pan 30, provided with the raised partitions 31, and falling thence upon the pan 32, provided with the raised partitions 33, drops into the bottom of the heater.

34 designates the exhaust-steam-inlet pipe, through which the supply of exhaust to heat the feed-water reaches the heater, said steam passing through the separator 35, which may be constructed in accordance with any approved design and may be of similar construction to the separator 8, already referred to. The exhaust-steam after leaving the separator 35 passes through the check-valve 36 and opening 37 into the upper part $38^x$ or body of the heater.

38 designates ports in the upper portion of the injector-casing 16, which permit the steam in the upper portion of the heater-casing to be discharged into the combining-tube 28 in such a direction as to assist the passage of the water through said combining-tube.

39 designates an open-ended tube leading from the desired water-level in the heater and extending through and discharging into the combining-tube 28.

40 designates a combined safety and relief valve, the construction of which I have shown in detail in a contemporaneously-pending application filed by me October 29, 1902, Serial No. 129,184, into which the passage 41, which communicates with the upper central portion of the heater, leads.

42 designates a footboard and cab-floor of a locomotive, in which are located hinged doors or lids 43 for permitting access to the pumping device and heater for the purpose of inspection and repairs.

44 designates the lower part of the rear end of a locomotive-boiler.

It will be understood that the pumping apparatus and the heater, both shown in the present instance as being attached to a locomotive-boiler below the footboard and cab-floor, may be used in other locations with equal effectiveness without departing from the spirit of my invention and that I have shown the present application of my invention as but one of the many uses to which it may be applied.

The operation is as follows: Water entering from the supply-pipe 22 and as controlled by the valve 24 and float 25, whose position is dependent upon the amount of water in the heater, passes to the injector-casing 16, where it meets exhaust-steam from the feed-pump 1, arriving through separator 8, check-valve 9, pipes 10 and 15, and float-controlled valve 20. This exhaust-steam combined with the supply-water in the combining-tube 28 then passes on through the spraying device 29 and falling over the pans 30 and 32 becomes heated by exhaust-steam reaching the heater through exhaust-steam pipe 34, separator 35, check-valve 36, and opening 37. It is evident that if there is a tendency to accumulate too much water in the heater the float 25 will rise, partly closing the valve 24, and thus reducing the amount of water entering the heater. If, however, there is too little water in the heater, the float 25 will fall, opening the valve 24 and permitting more water to enter the heater by reason of the suction from the injector. It is also evident that if there is too much water in the heater and the valve 24 therefore nearly or altogether closed the suction effect of the injector 16 will cause this valve to press heavily on its seat, and therefore tend to bind or refuse to work. To overcome this tendency and also to assist or in the absence of the valve 24 to entirely control the level of water in the heater, the valve 20 is used. This valve is so designed that when there is too little water in the heater and the float 19 is therefore lowered all of the exhaust-steam from the feed-pump arriving through the pipe 10 will be guided into pipe 14. When, however, there is too much water in the heater and the float 19 has therefore risen, the valve 20 will guide all or the greater part of the exhaust-steam coming from the feed-pipe through the opening 13 into the heater, thus relieving the injector of all or most of this exhaust-steam and the valve 24 of any excessive pressure. It is also evident that if the supply of heating exhaust-steam coming to the heater through the pipe 34 reaches it in violent fluctuations or puffs that these puffs acting against the delivery of the water through the spraying device 29 will cause a like fluctuating resistance to the feed-pump exhaust-steam, and consequent irregular action of the feed-pump. It is also evident that any violent fluctuations of this steam-pressure in the heater will also interfere with the smooth action of the valve 24. To overcome these irregularities, the assistant injector-jets 38 and 39 are used. These jets receive steam from the body of the heater, necessarily always at the same pressure as the pressure against which the water is being discharged through the spraying device 29, and will therefore assist the passage of water through the supply-pipe in an exact proportion to the resistance it meets in entering the heater. These assistant injector-jets may be led into the water-supply pipe at any place along its course, or they may take steam from any part of the feed-water-heater casing. The pipe 39 shows an assistant injector-jet taking steam from the heater at the point at which it is desired to maintain the water-level. If the water-level is lower than this, steam will enter this pipe and assist the water-supplying device in furnishing more water to the heater. If, however, there is too much water in the heater, the lower end of the pipe 39 will be submerged and hot water from the bottom of the heater will therefore reach the injector, thus not only depriving it of the assistance of steam from this jet, but also tending to decrease its water-forcing capacity through the well-known influence of hot water in destroying the action of injectors.

While I have shown the various injector-jets as entering concentrically into one injector-body, it is evident that more than one injector and more than one supply-pipe might be used, as found necessary or convenient, and controlled by either one or more valves 24 and floats 25. Attention is also called to the fact that after a puff of exhaust-steam from the feed-pump has entered the injector 16 and started its action the exhaust-steam entering the injector through openings 38 and 39 will tend to continue the injector in action as long as the valve 24 is open and until the next puff of exhaust-steam from the feed-pump. The volume of water entering the heater through the supply-pipe and spraying device will therefore come to it at a uniform rate in spite of the fact that the feed-pump exhaust is intermittent and that the pressure of steam in the heater may be subjected to violent fluctuations.

Attention is called to the combination of the spraying device 29 to distribute the entering water uniformly to the different parts of the heater and the pans 30 and 32, provided with raised projections, to continue this uniform distribution, also to the fact that exhaust-steam-inlet opening 37 is placed immediately under the upper pan, so as to prevent water splashing into it.

While I have shown the injector, with its assistant jets, in the interior of the heater-casing, it is evident that it may as conveniently be placed outside of the same and at any distance therefrom, limited only by the convenience of piping. Neither do I wish to be limited to the use of an injector operated by the exhaust-steam from the feed-pump for my heater water-supplying device. Any water-forcing device which would deliver an amount of water equal or proportional to that taken from the heater by the feed-pump and which would permit of the supply of water to the heater being further controlled by the valves 24 and 20 would carry out the spirit of the invention. The feed-pump with a separate water-supply pump attached directly thereto, as embodied in my contemporaneously-pending application, is cited as an illustration of a construction which would accomplish this result.

It will be apparent that various changes may be made by those skilled in the art which may come within the scope of my invention, and I do not, therefore, desire to be limited to the exact construction herein shown and described.

Having thus described my invention, what I claim as new, and desire to secure by Letters Patent, is—

1. In a feed-water-heating system for locomotives or other boilers, a plurality of water-forcing devices so related or connected together, or to the same source of power that the amount of water delivered by each is equal or nearly so, one of said devices being adapted to feed the boiler and the other to supply the heater, and the two being positively connected together, a valve in the suction of the water-forcing device, supplying the heater, and a float in the heater for controlling said valve.

2. The combination of a boiler, a heater-casing, a feed-pump, an injector operated by the exhaust-steam thereof to supply the heater and a device operated by the change of water-level in the heater, said device adjusting the amount of water passing through the injector.

3. The combination of a boiler, a heater-casing, a feed-pump, an injector operated by the exhaust-steam thereof, water-forcing devices so related or connected together or to the same source of power that the amount of water delivered by each tends to be continuously proportional, and a float in the heater controlling a valve in the supply-pipe to the water-forcing device supplying the heater, so as to regulate the amount of water therein.

4. In a feed-water-heating system for locomotives or other boilers, a plurality of water-forcing devices so related or connected together, or to the same source of power that the amount of water delivered by each is equal or nearly so, one of said devices being adapted to feed the boiler and the other to supply the heater, means for limiting or controlling the amount of water passing through that water-forcing device supplying the heater, and injectors of exhaust-steam taken from the body of the heater-casing or the exhaust-steam pipe leading to the heater-casing and so directed into the heater-supply piping as to assist the heater-supplying device in forcing water into the heater.

5. A heater, an exhaust-steam inlet thereto and a water-supply pipe, said water-supply pipe having in it an injector-combining tube and means within the heater for admitting injector-jets of exhaust-steam from the body of the heater or the exhaust-pipe thereto from the locomotive in such a direction as to assist the supply-water in entering the heater against any pressure therein.

6. A heater, an exhaust-steam inlet thereto, a water-supply pipe, and means extending to the water-level for admitting injector-jets of exhaust-steam.

7. A heater-casing, an exhaust-steam inlet thereto, a feed-pump, an injector operated by the exhaust-steam therefrom, and a controlling valve or valves in the feed-pump exhaust-pipe, whereby the feed-pump exhaust is sent to the said injector when the water in the heater is low and is sent elsewhere when the heater water-level is high.

8. The combination of a boiler, a heater-casing, a feed-pump, an injector operated by the exhaust-steam of said pump to feed the heater, and a device adjusting the amount of water passing through the injector.

9. In a feed-water-heating system for locomotives or other boilers, a plurality of water-forcing devices, so related or connected together, or to the same source of power, that the amount of water delivered by one tends to be continuously proportional to the amount of water delivered by the other, one of said devices being adapted to feed the boiler and the other to supply the heater, a valve in the suction of the water-forcing device supplying the heater, and a float in the heater for controlling said valve.

10. In a feed-water-heating system for locomotives or other boilers, a heater-casing, a main exhaust-inlet thereto, a feed-water inlet leading into said casing, a feed-pump located exteriorly of said casing, an injector located within said casing and operated by the exhaust of said feed-pump, and circulating devices coacting with said injector.

11. In a feed-water-heating system for locomotives or other boilers, a heater-casing, a main exhaust-inlet thereto, a feed-water inlet leading into said casing, a feed-pump located exteriorly of said casing, an injector located within said casing and operated by the exhaust of said feed-pump, float-actuated devices controlling the admission of exhaust-steam and water to said injector, and circulating devices coacting with said injector.

12. In a feed-water-heating system for locomotives or other boilers, a heater-casing, a main exhaust-inlet thereto, a feed-water inlet leading into said casing, a feed-pump located exteriorly of said casing, an injector located within said casing and operated by the exhaust of said feed-pump, a water-supply pipe leading from said feed-water inlet to said injector-casing, and means for admitting to said water-supply pipe an injector-jet of exhaust-steam taken from the body of the heater at the desired water-level.

13. In a feed-water-heating system for locomotives or other boilers, a heater-casing, a main exhaust-inlet thereto, a feed-water inlet leading into said casing, a feed-pump located exteriorly of said casing, an injector located within said casing and operated by the exhaust of said feed-pump, a water-supply pipe leading from said feed-water inlet to the injector-casing, an open-ended pipe discharging into said injector-casing, a series of auxiliary ports for the admission of exhaust-steam located above said injector-casing, and means for spraying and deflecting the water after the latter leaves said injector-casing.

14. In a feed-water-heating system for locomotives or other boilers, a heater-casing, a main exhaust-inlet thereto, a feed-water inlet leading into said casing, a feed-pump located exteriorly of said casing, an injector located within said casing and operated by the exhaust of said feed-pump, a water-supply pipe leading from said feed-water inlet to the injector-casing, an open-ended pipe discharging into said injector-casing, a series of auxiliary ports for the admission of exhaust-steam located above said injector-casing, and means for spraying and deflecting the water after the latter leaves said injector-casing, in combination with a float-controlled valve in the pipe conducting feed-water to the heater-casing.

15. In a feed-water-heating system for locomotives or other boilers, a heater-casing, a main exhaust-inlet thereto, a feed-water inlet leading into said casing, a feed-pump located exteriorly of said casing, an injector located within said casing and operated by the exhaust of said feed-pump, a water-supply pipe leading from said feed-water inlet to the injector-casing, an open-ended pipe discharging into said injector-casing, a series of auxiliary ports for the admission of exhaust-steam located above said injector-casing, and means for spraying and deflecting the water after the latter leaves said injector-casing, in combination with a float-controlled valve in the pipe which leads the exhaust-steam from the feed-pump to said injector-casing.

16. In a feed-water-heating system for locomotives or other boilers, a heater-casing, a main exhaust-inlet thereto, a feed-water inlet leading into said casing, a feed-pump located exteriorly of said casing, an injector located within said casing and operated by the exhaust of said feed-pump, a water-supply pipe leading from said feed-water inlet to the injector-casing, an open-ended pipe discharging into said injector-casing, a series of auxiliary ports for the admission of exhaust-steam located above said injector-casing, and means for spraying and deflecting the water after the latter leaves said injector-casing, in combination with a float-controlled valve in the pipe conducting feed-water to the heater-casing, and a float-controlled valve in the pipe conducting the exhaust-steam from the feed-pump to said injector-casing.

17. In a feed-water-heating system for locomotives or other boilers, a heater-casing, a main exhaust-inlet thereto, a feed-pipe leading into said casing, a feed-pump, a forcing device operated by the exhaust of said feed-pump and located in said pipe, and circulating devices coacting with said forcing device.

18. In a feed-water-heating system for locomotives or other boilers, a heater-casing, a main exhaust-inlet thereto, a feed-water pipe leading into said casing, a feed-pump, a forcing device operated by the exhaust of said feed-pump, circulating devices coacting with said forcing device, and float-actuated devices controlling the admission of exhaust-steam and water to said forcing device.

19. In a feed-water-heating system for locomotives or other boilers, a heater-casing, a main exhaust-inlet thereto, a feed-water-supply pipe leading into said casing, a feed-pump, a forcing device operated by the exhaust of said feed-pump and located in said water-supply pipe, and means for admitting to said water-supply pipe injector-jets of steam taken from within the heater.

20. In a feed-water-heating system for locomotives or other boilers, a heater-casing, a main exhaust-inlet thereto, a feed-water pipe leading into said casing, a feed-pump, a forcing device located in said pipe and operated by the exhaust of said feed-pump, an open-ended pipe leading from the heater water-level to the casing of the forcing device, a series of auxiliary ports for the admission of exhaust-steam located in said pipe, and means for spraying and deflecting the water after the latter leaves said feed-water pipe.

21. In a feed-water-heating system for locomotives or other boilers, a heater-casing, a main exhaust-inlet thereto, a feed-water pipe leading into said casing, a feed-pump, a forcing device in said pipe operated by the exhaust of said feed-pump, an open-ended pipe leading from the heater water-level to the casing of said forcing device, a series of auxiliary ports for the admission of exhaust-steam located above said forcing-device casing, means for spraying and deflecting the water after the latter leaves said feed-water pipe, and a float-controlled valve in the feed-water pipe.

22. In a feed-water-heating system for locomotives or other boilers, a heater-casing, a main exhaust-inlet thereto, a feed-water pipe leading into said casing, a feed-pump, a forcing device in said pipe and operated by the exhaust of said feed-pump, an open-ended pipe leading from the heater water-level to the casing of said forcing device, a series of auxiliary ports for the admission of exhaust-steam located above said forcing-device casing, means for spraying and deflecting the water after the latter leaves said feed-water pipe, and a float-controlled valve in the pipe which leads the exhaust-steam from the feed-pump to said forcing-device casing.

23. In a feed-water-heating system for locomotives or other boilers, a heating-casing, a main exhaust-inlet thereto, a feed-water pipe leading into said casing, a feed-pump, a forcing device within said pipe and operated by the exhaust of said feed-pump, an open-ended pipe leading from the heater water-level to the casing of the forcing device, a series of auxiliary ports for the admission of exhaust-steam located above said forcing-device casing, means for spraying and deflecting water after the latter leaves said pipe, a float-controlled valve in said pipe, and a float-controlled valve in the pipe conducting the exhaust-steam from the feed-pump to said forcing-device casing.

24. The combination of a boiler, a heater-casing, a feed-pump, a forcing device to supply the heater and operated by the exhaust-steam thereof, and a float in the heater adjusting a valve in the water-supply pipe to the forcing device.

25. In a water-heating system for locomotives or other boilers, a heater-casing, a main exhaust-steam inlet thereto, a feed-pump and a water-forcing device to supply the heater operated by the feed-pump exhaust and by exhaust-steam taken from the heater at the heater water-level.

26. In a feed-water-heating system for locomotives or other boilers, a heater-casing, a main exhaust-steam inlet thereto, a feed-pump and a water-forcing device to supply the heater operated by the feed-pump exhaust and by exhaust-steam taken from the heater at the heater water-level, in combination with means of control of the feed-pump exhaust-steam and water reaching the water-forcing device.

27. In a feed-water-heating system for locomotives or other boilers, a heater-casing, a main exhaust-steam inlet thereto, a feed-pump and a water-forcing device to supply the heater operated by the feed-pump exhaust and by exhaust-steam taken from the heater at the heater water-level, in combination with float-actuated devices controlling the amount of feed-pump exhaust-steam and water passing through the water-forcing device.

28. In a feed-water-heating system for locomotives or other boilers, a heater-casing, a main exhaust-inlet thereto, a feed-water pipe leading into said casing, a feed-pump, a water-forcing device operated by the exhaust of said feed-pump and located in said pipe and circulating devices consisting of injector-jets of exhaust-steam and water taken into said pipe from the casing and coacting with said water-forcing device.

THOMAS C. McBRIDE.

Witnesses:
   E. HAYWARD FAIRBANKS,
   C. D. McVAY.